United States Patent [19]
Kanetake

[11] Patent Number: 5,424,908
[45] Date of Patent: Jun. 13, 1995

[54] PACKAGE-TYPE SOLID ELECTROLYTIC CAPACITOR

[75] Inventor: Yasuo Kanetake, Kyoto, Japan

[73] Assignee: Rohm Co., Ltd., Kyoto, Japan

[21] Appl. No.: 235,529

[22] Filed: Apr. 29, 1994

[30] Foreign Application Priority Data

May 12, 1993 [JP] Japan .................. 5-110580

[51] Int. Cl.⁶ .................. H01G 1/10; H01G 9/00
[52] U.S. Cl. .................. 361/534; 361/523; 361/541
[58] Field of Search .................. 361/830, 301.3, 328, 361/523, 539, 541, 272, 275.1, 534, 15, 16, 17; 29/25.03, 25.42; 174/52.2, 52.4; 264/272.11, 272.14, 272.18

[56] References Cited

U.S. PATENT DOCUMENTS

| | | | |
|---|---|---|---|
| 3,041,501 | 6/1962 | Willits | 315/205 |
| 4,455,586 | 6/1984 | McCartney | 361/56 |
| 4,935,848 | 6/1990 | Yamane | 361/534 |
| 4,984,134 | 1/1991 | Lock | 361/529 |

FOREIGN PATENT DOCUMENTS

| | | |
|---|---|---|
| 488130 | 6/1992 | European Pat. Off. . |
| 1252310 | 10/1967 | Germany . |
| 1301861 | 8/1969 | Germany . |
| 2947185 | 6/1980 | Germany . |
| 60-220922 | 11/1985 | Japan . |

Primary Examiner—Bruce A. Reynolds
Assistant Examiner—Michael D. Switzer
Attorney, Agent, or Firm—William H. Eilberg

[57] ABSTRACT

A package-type solid electrolytic capacitor is provided which comprises a pair of capacitor elements, a pair of diodes associated with the capacitor elements, a pair of leads associated with the capacitor elements and the diodes, and a resin package enclosing the capacitor elements, the diodes and part of the leads. The leads may be exchangeably connectable to a positive and a negative electrodes of a circuit pattern. In one state of lead connection, one of the diodes passes a current only for one of the capacitor elements. In the other state of lead connection, the other diode passes a current only for the other capacitor element. Thus, the capacitor is non-polar and therefore can be mounted without paying any attention to the polarity.

6 Claims, 5 Drawing Sheets

PACKAGE-TYPE SOLID ELECTROLYTIC CAPACITOR

BACKGROUND OF THE INVENTION

1. Field of the Invention

This invention relates to a solid electrolytic capacitor, such as tantalum capacitor or aluminum capacitor, which comprises a resin package from which a pair of leads projects out for electrical connection to a circuit pattern.

2. Description of the Related Art

A package-type solid electrolytic capacitor is known from Japanese Patent Application Laid-open No. 60-220922 for example. The capacitor disclosed in this Japanese document comprises a capacitor element which includes a capacitor chip and an anode wire projecting from the chip. The anode wire is electrically connected to an anode lead, whereas the chip is electrically connected to a cathode lead.

The capacitor further includes a resin package enclosing the capacitor element together with part of the anode and cathode leads. The projecting portions of the respective leads are bent toward the underside of the resin package for conveniently mounting to a surface of a circuit board (not shown).

The prior art capacitor is a polar component, so that some measure must be taken to ensure that the capacitor is mounted with a correct polarity relative to the circuit pattern of the circuit board. As a result, the mounting of the capacitor becomes troublesome particularly if the capacitor has a symmetric configuration. Further, if the capacitor is mounted with a reverse polarity, it generates a lot of heat, thereby critically damaging the capacitor and/or the circuit in which the capacitor is incorporated.

SUMMARY OF THE INVENTION

It is, therefore, an object of the present invention to provide a package-type solid electrolytic capacitor which can be mounted without paying any attention to the polarity.

The present invention also seeks to provide an additional function of maintaining safety for such a capacitor.

According to the present invention, there is provided a package-type solid electrolytic capacitor comprising: a first capacitor element having a cathode-side member and an anode-side member; a second capacitor element also having a cathode-side member and an anode-side member; a conductor means for electrically connecting between the respective anode-side members of the first and second capacitor elements; a first lead electrically connected to the cathode-side member of the first capacitor element; a second lead electrically connected to the cathode-side member of the second capacitor element; a first diode interposed between the cathode-side and anode-side members of the first capacitor element for passing a current only in a direction from the cathode-side member to anode-side member of the first capacitor element; a second diode interposed between the cathode-side and anode-side members of the second capacitor element for passing a current only in a direction from the cathode-side member to anode-side member of the second capacitor element; and a resin package enclosing the respective capacitor elements, the conductor means, part of the respective leads, and the respective diodes.

According to one embodiment of the present invention, each of the first and second diodes has a negative pole electrically connected to the conductor means through a metal wire, whereas said each of the first and second diodes also has a positive pole electrically connected to the cathode-side member of a corresponding one of the first and second capacitor elements through another metal wire.

According to another embodiment of the present invention, each of the first and second diodes has a P-type substrate electrically connected wirelessly to the cathode-side member of a corresponding one of the first and second capacitor elements, said each of the first and second diodes also having a N-type surface portion formed in the P-type substrate and electrically connected to the conductor means through a metal wire.

According to a further embodiment of the present invention, each of the first and second diodes has a N-type substrate electrically connected wirelessly to the conductor means, said each of the first and second diodes also having a P-type surface portion formed in the N-type substrate and electrically connected to the cathode-side member of a corresponding one of the first and second capacitor elements through a metal wire.

In either of the above embodiments, the cathode-side member of each of the first and second capacitor elements may be electrically connected to a corresponding one of the first and second leads through a safety fuse. The incorporation of such a safety fuse is preferred for protecting the capacitor against an overheat and/or overcurrent.

Other objects, features and advantages of the present invention will be fully understood from the following detailed description given with reference to the accompanying drawings.

BRIEF DESCRIPTION OF THE DRAWINGS

In the accompanying drawings:

FIG. 5a is a sectional view showing a diode chip incorporated in the capacitor of FIG. 5;

FIG. 6a is a sectional view showing a diode chip incorporated in the capacitor of FIG. 6;

DETAILED DESCRIPTION OF THE PREFERRED EMBODIMENTS

Figure 1:
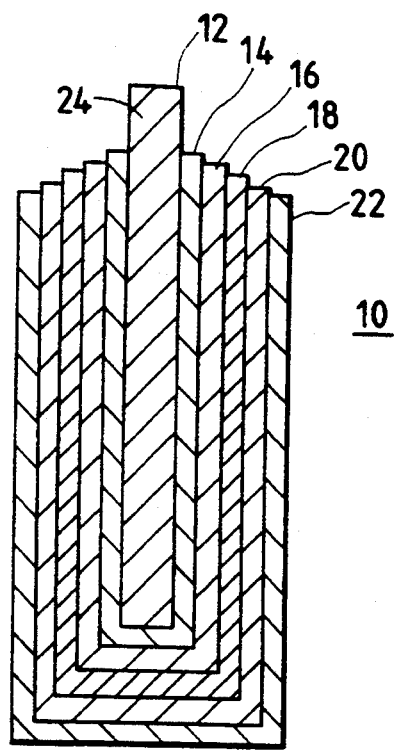
FIG. 1 is a front view, in vertical section, showing a package-type solid electrolytic capacitor according to a first embodiment of the present invention.
Figure 2:
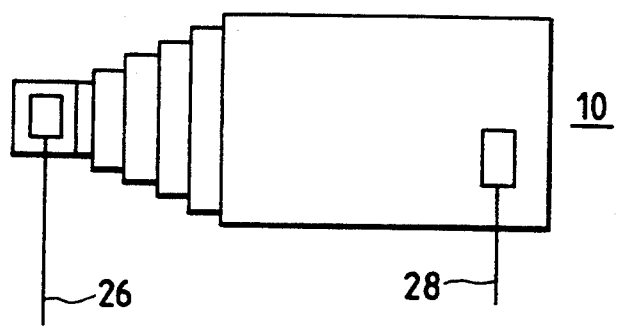
FIG. 2 is a section taken along lines II—II in FIG. 1.
Figure 3:
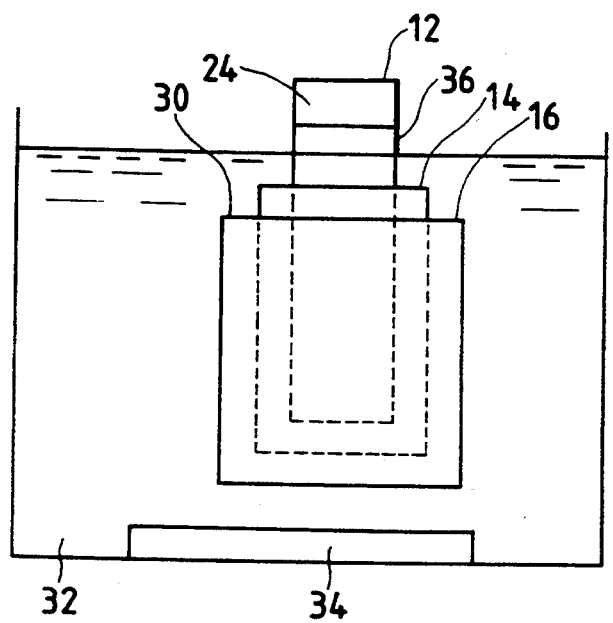
FIG. 3 is a perspective view showing the same capacitor.
Figure 3:
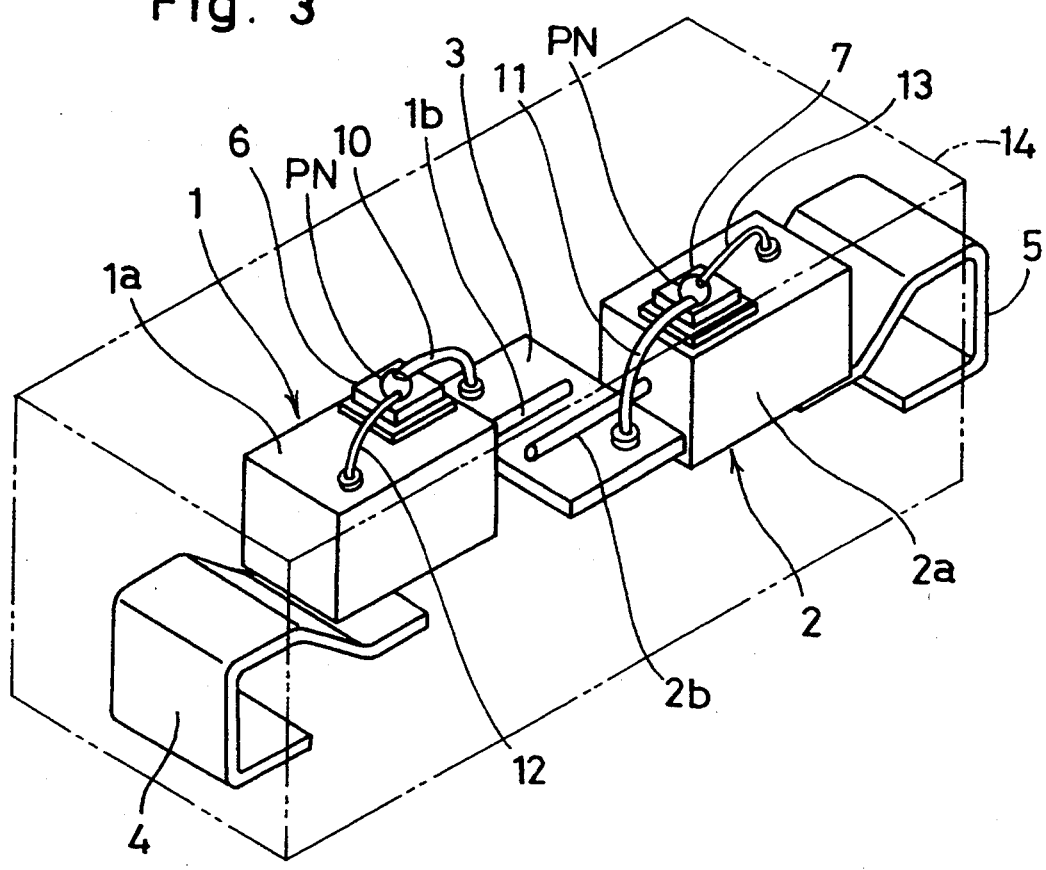

Referring first to FIGS. 1 through 3 of the accompanying drawings, there is shown a package-type solid electrolytic capacitor according to a first embodiment of the present invention. The capacitor may be a tantalum capacitor or an aluminum capacitor for example.

The capacitor of the first embodiment comprises a first capacitor element 1 and a second capacitor element 2. The first capacitor element 1 includes a capacitor chip 1a (a cathode-side member) and an anode wire 1b (an anode-side member) projecting from the capacitor chip 1a toward the second capacitor element 2. Similarly, the second capacitor element 2 includes a capacitor chip 2a and an anode wire 2b projecting from the capacitor chip 2a toward the first capacitor element 1.

Each of the chips 1a, 2a may be a compacted and sintered mass of tantalum powder for example, in which case each of the anode wires 1b, 2b is also made of tantalum.

The anode wires 1b, 2b of the respective capacitor elements are electrically connected commonly to a metallic intermediate connector plate 3 by welding for example. Further, the chip 1a of the first capacitor element 1 is electrically connected directly to a first lead 4, whereas the chip 2a of the second capacitor element 2 is electrically connected directly to a second lead 5.

A first diode chip 6 having a PN diode circuit is mounted to the capacitor chip 1a of the first capacitor element 1 via an insulating layer 8. The diode circuit of the first diode chip 6 has a negative pole (N-pole) electrically connected to the intermediate connector plate 3 through a metal wire 10, and a positive pole (P-pole) electrically connected to the capacitor chip 1a through another metal wire 12.

Similarly, a second diode chip 7 having a PN diode circuit is mounted to the capacitor chip 2a of the second capacitor element 2 via an insulating layer 9. The diode circuit of the second diode chip 7 has a negative pole (N pole) electrically connected to the intermediate connector plate 3 through a metal wire 11, and a positive pole (P pole) electrically connected to the capacitor chip 2a through another metal wire 13.

A package 14 of a synthetic resin encloses the above-mentioned components with the respective leads 4, 5 partially projecting therefrom. The projecting portions of the respective leads 4, 5 are bent toward the underside of the package 14 for conveniently mounting to a surface of a printed circuit board (not shown).

Figure 4:
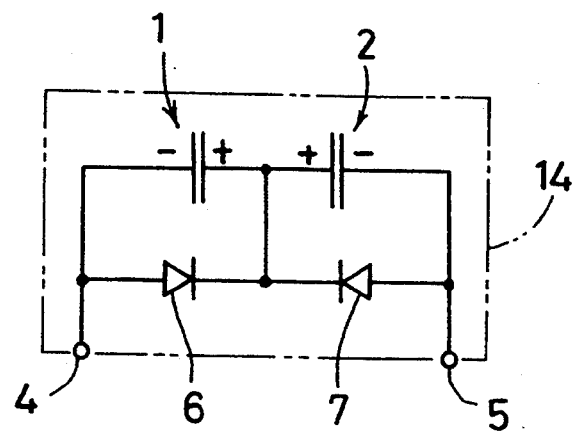
FIG. 4 is a view showing equivalent circuit corresponding to the same capacitor.

FIG. 4 shows an equivalent circuit corresponding to the capacitor illustrated in FIGS. 1–3.

In mounting the capacitor to the unillustrated circuit board, the first lead 4 may be connected to a positive electrode of the circuit pattern of the circuit board with the second lead 5 connected to a negative electrode. In such a mounting condition, a current from the positive electrode (namely, the first lead 4) bypasses the first capacitor element 1 through the first diode 6 for charging the second capacitor element 2.

Alternatively, the first lead 4 may be connected to the negative electrode of the circuit pattern of the circuit board with the second lead 5 connected to the positive electrode. In such a mounting condition, a current from the positive electrode (namely, the second lead 5) bypasses the second capacitor element 2 through the second diode 7 for charging the first capacitor element 1.

As described above, the first and second leads 4, 5 of the capacitor are exchangeably connectable to the positive and negative electrodes of the circuit pattern, so that the capacitor can be regarded non-polar. In either state of mounting, the first or second capacitor element 1, 2 is prevented from being subjected to a reverse voltage, thereby avoiding a critical damage which might be caused by heat generation due to the reverse mounting. Thus, it is unnecessary to find out and replace the capacitor which would be otherwise damaged by such reverse mounting.

Figure 5:
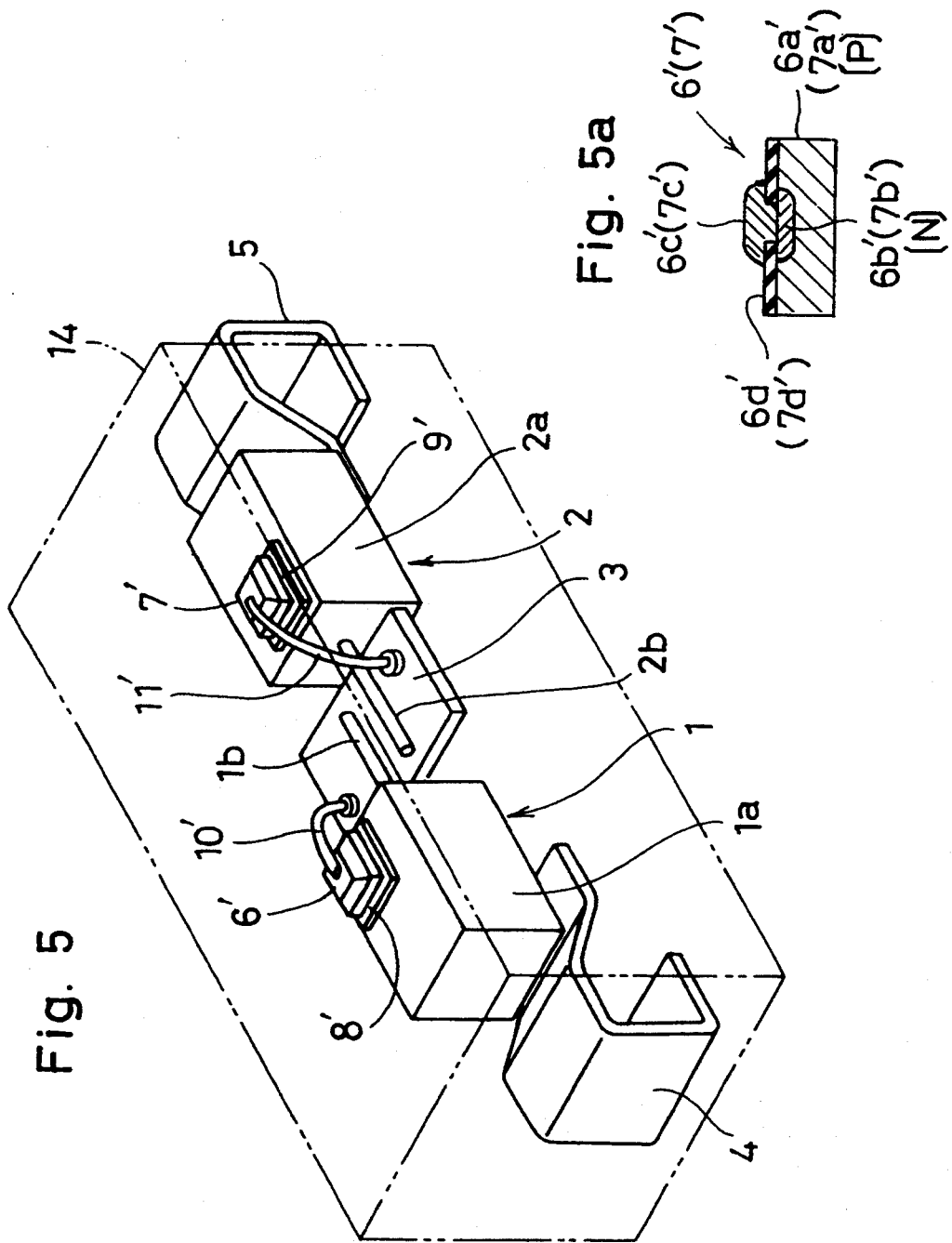
FIG. 5 is a perspective view showing a package-type solid electrolytic capacitor according to a second embodiment of the present invention.

FIGS. 5 and 5a show a package-type solid electrolytic capacitor according to a second embodiment of the present invention. The capacitor of this embodiment is similar to that of the first embodiment but differs therefrom in that a first and a second diode chips 6', 7' are mounted on the respective capacitor chips 1a, 2a via respective conductive layers 8', 9' which may be made of a conductive paste or adheseive.

As shown in FIG. 5a, each of the diode chips 6', 7' includes a P-type substrate 6a', 7a' in which is formed an N-type surface portion 6b', 7b'. The N-type surface portion 6b', 7b' is connected to a conductor pad 6c', 7c' which is separated from the P-type substrate 6b', 7b' by an insulating layer 6d', 7d'.

The N-type surface portions 6b', 7b' (namely, the conductor pad 6c', 7c') of the respective diode chips 6', 7' are electrically connected to the metallic intermediate connector plate 3 through respective metal wires 10', 11'. Conversely, the P-type substrates 6a', 7a' of the respective diode chips 6', 7' are electrically connected to the respective capacitor chips 1a, 2a wirelessly via the respective conductive layers 8', 9'.

The second embodiment is advantageous in that the number of wire bonding steps can be reduced, thereby simplifying the manufacturing process. Obviously, the capacitor of the second embodiment operates substantially in the same manner as that of the first embodiment.

Figure 6:
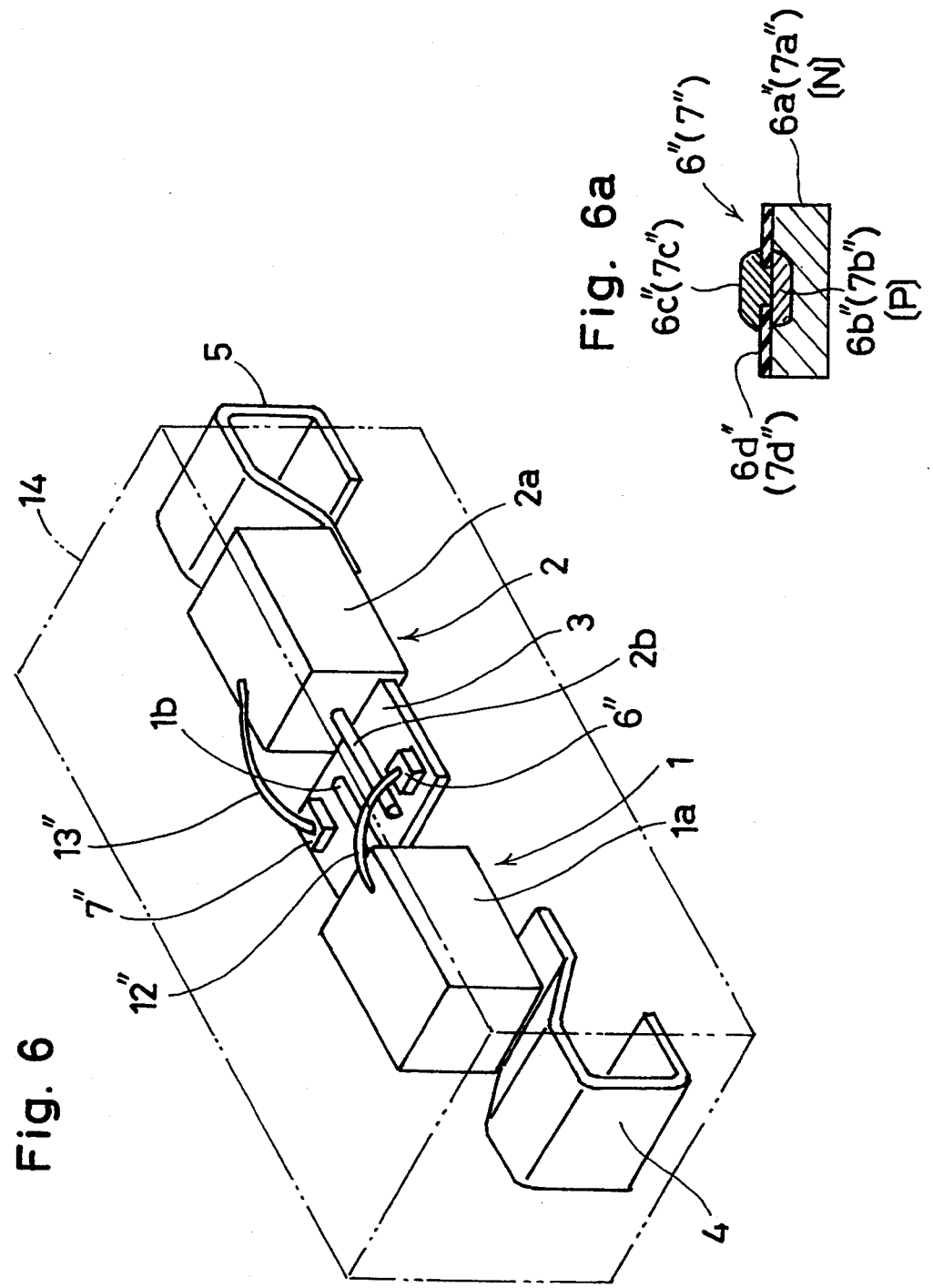
FIG. 6 is a perspective view showing a package-type solid electrolytic capacitor according to a third embodiment of the present invention.

FIGS. 6 and 6a show a package-type solid electrolytic capacitor according to a third embodiment of the present invention. The capacitor of this embodiment is similar to that of the first embodiment but differs therefrom in that a first and a second diode chips 6", 7" are mounted commonly on the metallic intermediate connector plate 3 via respective conductive layers (not shown) which may be made of a conductive paste or adheseive.

As shown in FIG. 6a, each of the diode chips 6", 7" includes an N-type substrate 6a", 7a" in which is formed a P-type surface portion 6b", 7b". The P-type surface portion 6b", 7b" is connected to a conductor pad 6c", 7c" which is separated from the N-type substrate 6b", 7b" by an insulating layer 6d", 7d".

The P-type surface portions 6b", 7b" (namely, the conductor pad 6c", 7c") of the respective diode chips 6", 7" are electrically connected to the respective capacitor chips 1a, 2a through respective metal wires 12", 13". Conversely, the N-type substrates 6a", 7a" of the respective diode chips 6", 7" are electrically connected to the intermediate connector plate 3 wirelessly via the unillustrated conductive layers.

Like the second embodiment, the third embodiment is advantageous in that the number of wire bonding steps can be reduced, thereby simplifying the manufacturing process. Further, since the respective diode chips 6", 7" are mounted on the intermediate connector plate 3 instead of the respective capacitor chips 1a, 2a, the height of the diode chips 6", 7" is not additional to the size of the resin package 14, thereby enabling a size and weight reduction.

Figure 7:
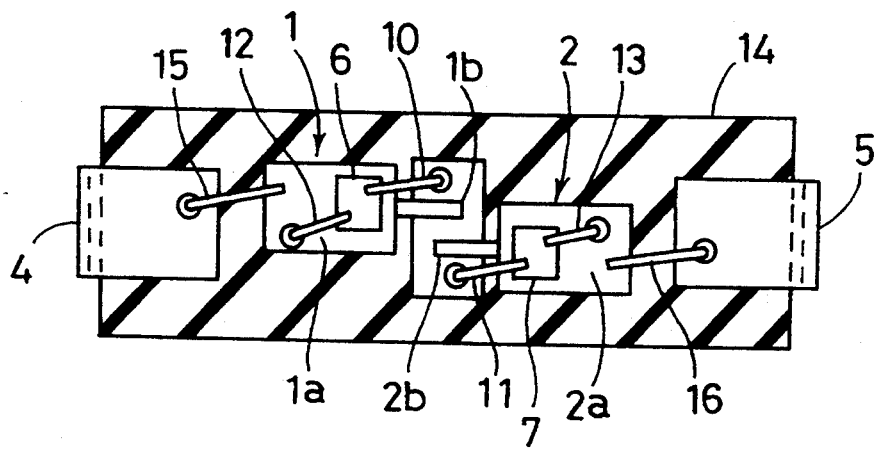
FIG. 7 is a perspective view showing a package-type solid electrolytic capacitor according to a fourth embodiment of the present invention.
Figure 8:
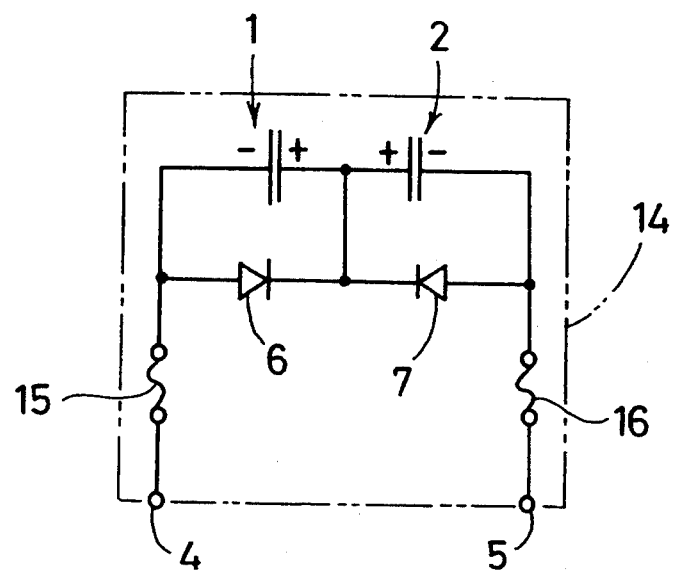
FIG. 8 is a view showing an equivalent circuit corresponding to the capacitor of FIG. 7.

FIGS. 7 and 8 show a package-type solid electrolytic capacitor according to a fourth embodiment of the present invention. The capacitor of this embodiment is similar to that of the first embodiment but differs therefrom only in that the first capacitor chip 1a is connected to the first lead 4 via a first safety fuse 15, whereas the second capacitor chip 2a is connected to the second lead 5 via a second safety fuse 5. Each of the first and second safety fuses 15, 16 may be a temperature fuse or an overcurrent, or works dually as a temperature fuse and an overcurrent fuse.

The third embodiment is advantageous in that the capacitor elements 1, 2 are protected against damages which might be caused by an overheat or overcurrent.

The present invention being thus described, it is obvious that the same may be varied in many ways. For instance, the safety fuses 15, 16 shown for the fourth embodiment may also be incorporated into the capacitors of the second and third embodiments. Such variations are not to be regarded as a departure from the spirit and scope of the present invention, and all such modifications as would be obvious to those skilled in the art are intended to be included within the scope of the following claims.

I claim:

1. A package-type solid electrolytic capacitor comprising:
   a first capacitor element having a cathode-side member and an anode-side member;
   a second capacitor element also having a cathode-side member and an anode-side member;
   a conductor means for electrically connecting between the respective anode-side members of the first and second capacitor elements;
   a first lead electrically connected to the cathode-side member of the first capacitor element;
   a second lead electrically connected to the cathode-side member of the second capacitor element;
   a first diode interposed between the cathode-side and anode-side members of the first capacitor element for passing a current only in a direction from the cathode-side member to the anode-side member of the first capacitor element;
   a second diode interposed between the cathode-side and anode-side members of the second capacitor element for passing a current only in a direction from the cathode-side member to the anode-side member of the second capacitor element; and
   a resin package enclosing the respective capacitor elements, the conductor means, part of the respective leads, and the respective diodes,
   wherein exactly one of the capacitor elements becomes operative and exactly one of the capacitor elements is bypassed when an external voltage of a given polarity is applied.

2. The capacitor according to claim 1, wherein each of the first and second diodes has a negative pole electrically connected to the conductor means through a metal wire, whereas said each of the first and second diodes also has a positive pole electrically connected to the cathode-side member of a corresponding one of the first and second capacitor elements through another metal wire.

3. The capacitor according to claim 1, wherein each of the first and second diodes has a P-type substrate electrically connected wirelessly to the cathode-side member of a corresponding one of the first and second capacitor elements, said each of the first and second diodes also having a N-type surface portion formed in the P-type substrate and electrically connected to the conductor means through a metal wire.

4. The capacitor according to claim 1, wherein each of the first and second diodes has a N-type substrate electrically connected wirelessly to the conductor means, said each of the first and second diodes also having a P-type surface portion formed in the N-type substrate and electrically connected to the cathode-side member of a corresponding one of the first and second capacitor elements through a metal wire.

5. The capacitor according to claim 1, wherein the cathode-side member of each of the first and second capacitor elements is electrically connected to a corresponding one of the first and second leads through a safety fuse.

6. The capacitor according to claim 1, wherein the anode-side member of each of the first and second capacitor elements is an anode wire, the conductor means being an intermediate connector plate arranged between the respective capacitor elements and electrically connected to the anode wire.

* * * * *